United States Patent
Blank et al.

(10) Patent No.: US 9,693,120 B2
(45) Date of Patent: Jun. 27, 2017

(54) SYSTEM AND METHOD FOR TRANSMITTING MEASUREMENT SIGNALS IN SPATIALLY EXTENSIVE SUPPLY NETWORKS

(71) Applicant: ABB TECHNOLOGY AG, Zürich (CH)

(72) Inventors: Frederik Blank, Heidelberg (DE); Markus Gauder, Hockenheim (DE); Stefan Lauxtermann, Porta Westfalica (DE); Werner A. Schmidt, Heddesheim (DE)

(73) Assignee: ABB Schweiz AG, Baden (CH)

( * ) Notice: Subject to any disclaimer, the term of this patent is extended or adjusted under 35 U.S.C. 154(b) by 853 days.

(21) Appl. No.: 13/662,818

(22) Filed: Oct. 29, 2012

(65) Prior Publication Data

US 2013/0054174 A1 Feb. 28, 2013

Related U.S. Application Data

(63) Continuation of application No. PCT/EP2011/001703, filed on Apr. 6, 2011.

(30) Foreign Application Priority Data

Apr. 30, 2010 (DE) ........................ 10 2010 019 086

(51) Int. Cl.
*G06F 15/00* (2006.01)
*H04Q 9/00* (2006.01)
*H04L 29/08* (2006.01)

(52) U.S. Cl.
CPC .............. *H04Q 9/00* (2013.01); *H04L 67/12* (2013.01); *G08C 2201/10* (2013.01); *H04Q 2209/40* (2013.01); *H04Q 2209/86* (2013.01)

(58) Field of Classification Search
CPC ...... H04Q 9/00; H04Q 2209/40; G06Q 50/06; G06Q 10/04; G06Q 10/06; H04L 67/12
See application file for complete search history.

(56) References Cited

U.S. PATENT DOCUMENTS

| | | | |
|---|---|---|---|
| 4,517,468 A | 5/1985 | Kemper et al. | |
| 2003/0214400 A1* | 11/2003 | Mizutani | G08B 13/19656 340/531 |

(Continued)

FOREIGN PATENT DOCUMENTS

| | | |
|---|---|---|
| DE | 102007030597 A1 | 1/2009 |
| EP | 2086247 A2 | 8/2009 |

(Continued)

OTHER PUBLICATIONS

International Search Report (PCT/ISA/210) issued on Aug. 24, 2011, by the European Patent Office as the International Searching Authority for International Application No. PCT/EP2011/001703.

*Primary Examiner* — Tung Lau
(74) *Attorney, Agent, or Firm* — Barnes & Thornburg LLP

(57) ABSTRACT

Exemplary systems and methods for monitoring a current state of a spatially extensive supply network having at least one control station that monitors and controls the supply network and a plurality of sensors that transmit measurement values relating to operating behavior to the at least one control station. Current measurement values are measured at positions on the supply network corresponding to each sensor. Each sensor analyzes measured signal variations and signal trends of the measured current values via an evaluating unit. The measurement values of each respective sensor are transmitted to the at least one control station in data packets at a defined time. At each respective sensor, when the analysis detects an abnormal measurement signal variation, a frequency of transmission of the respective (Continued)

sensor and each adjacent sensor is increased, the respective sensor transmitting the measurement values to the at least one control station or to adjacent sensors to which the respective sensor is connected to through a common supply line and which measure an identical or physically similar quantity.

22 Claims, 1 Drawing Sheet

(56) References Cited

U.S. PATENT DOCUMENTS

| | | |
|---|---|---|
| 2004/0178905 A1 | 9/2004 | Dernler et al. |
| 2009/0195396 A1 | 8/2009 | Ballester Merelo et al. |
| 2010/0027235 A1* | 2/2010 | Samuelson ............... F17D 5/06 361/816 |
| 2010/0293263 A1* | 11/2010 | Caire ...................... H04Q 9/00 709/223 |

FOREIGN PATENT DOCUMENTS

| | | |
|---|---|---|
| WO | WO 03/010911 A2 | 2/2003 |
| WO | WO 2009/106095 A1 | 9/2009 |

* cited by examiner

SYSTEM AND METHOD FOR TRANSMITTING MEASUREMENT SIGNALS IN SPATIALLY EXTENSIVE SUPPLY NETWORKS

RELATED APPLICATIONS

This application is a bypass continuation under 35 U.S.C. §120 of International Application PCT/EP2011/001703 filed on Apr. 6, 2011, designating the U.S. and which claims priority to German Application No. 10 2010 019 086.1 filed in Germany on Apr. 30, 2010 the content of each application is hereby incorporated in their entirety by reference.

FIELD

The disclosure relates to a system and to a method for transmitting measurement signals in spatially extensive supply networks having at least one sensor for transmitting statistical characteristic values or measurement values relating to the operating behavior to at least one control station which is used for monitoring and controlling the respective supply network.

BACKGROUND INFORMATION

To monitor the current state of supply networks, such as spatially extensive supply networks for flowing media such as supply water, gas, or oil, a multiplicity of measuring devices can be provided which are installed at precisely defined positions in order to measure, and convey to a control station, current measurement values such as, for example, the pressure, the flow or the rate of flow.

The control station can be a central or decentralized control room including appropriate devices, from which control room the supply network is managed, that is to say that the monitoring and controlling of the operation of the network is carried out from here. In the control room, the measurement signals and measurement values conveyed are correspondingly processed further and visually displayed.

Due to the frequently large spatial extension of supply networks, the data transmission of the many sensors is frequently not provided by cable but by radio to the control station. This dispenses with laying and maintaining expensive cable installations along the supply lines.

The measurement values determined in each case by the sensors are transmitted by radio, for example by means of GPRS (General Packet Radio Service) to a compatible receiver which then forwards these to the control station.

The power supply for the measuring devices and transmitting and receiving devices is generally provided locally by battery or by supply from energy gained in the environment of the sensor, for example solar current.

To save energy, the individual data items to be transmitted are combined and/or processed further in data packets, for example mean values are formed, compressed and transmitted by radio, at fixed times, for example every 30 minutes.

However, this has the disadvantage that current information about the network status is available only at particular times and in the case of problems in the network, a delay occurs in the transmission of information.

On the other hand, an inappropriate increase in the frequency of data transmission in the case of sensors operated purely by battery would lead to the battery capacity being exhausted earlier and the batteries, therefore, having to be replaced more frequently, such that a part of the maintenance workers would only be used for this purpose and could not be used for other maintenance measures. The resultant additional expenditure on personnel or time delays in performing such measures represent a considerable cost factor.

Another aspect which plays a role in this connection and should be taken into consideration relates to the abundance of sensors used. While the abundance, and thus the distribution of sensors, is limited because of the purchasing and maintenance costs at that time, in numerous known supply systems, for example, for a relatively long time, significantly more sensors can be found in more recent installed systems, in less large spatially extensive supply systems because of the recently comparatively low costs for purchasing and operating sensor systems. It is this circumstance which has led to more and more sensor systems being used in the field.

The volumes of data transmitted into the control station in this context are very large, on the one hand, but, on the other hand, also frequently of poor quality, with the consequence that the data cannot be used for analysis purposes, or only in a very restricted way.

SUMMARY

An exemplary system for a current state of a spatially extensive supply network is disclosed, comprising: at least one control station that monitors and controls the supply network; and a plurality of sensors for transmitting current measurement values relating to an operating behavior to the at least one control station over the supply network, wherein each sensor is located at respective positions in the supply network for locally determining the current measurement values, and includes an evaluating unit that analyzes measured signal variations and trends, wherein in order to transmit respective measurement values to the at least one control station, a data transmission is provided which transmits the data in packets and at defined times and which is provided dynamically, and wherein when a respective sensor detects an abnormal signal variation, a frequency of transmission of the respective sensor and each adjacent sensor is increased, wherein the respective sensor transmits the measurement values to the at least one control station or to adjacent sensors to which the respective sensor is connected by a common supply line and which measure an identical or physically similar quantity.

An exemplary method for monitoring a current state of a spatially extensive supply network is disclosed, the method having at least one control station for monitoring and controlling the supply network and a plurality of sensors for transmitting measurement values relating to operating behavior to the at least one control station, the method comprising: measuring current measurement values at positions on the supply network corresponding to each sensor; analyzing measured signal variations and signal trends of the measured current values via an evaluating unit of each respective sensor; and transmitting respective measurement values to the at least one control station in data packets at a defined time, wherein when the analysis detects an abnormal measurement signal variation, increasing a frequency of transmission of the respective sensor and each adjacent sensor, the respective sensor transmitting the measurement values to the at least one control station or to adjacent sensors to which the respective sensor is connected to through a common supply line and which measure an identical or physically similar quantity.

An exemplary computer readable medium having program code recorded thereon is disclosed, which, when in communicable contact with a processor, causes the processor to execute a method for monitoring a current state of a spatially extensive supply network having at least one control station for monitoring and controlling the supply network and a plurality of sensors for transmitting measurement values relating to operating behavior to the at least one control station, each sensor having a respective processor, the method comprising: measuring current measurement values at positions on the supply network corresponding to each sensor; analyzing measured signal variations and signal trends of the measured current values via an evaluating unit of each respective sensor; and transmitting, respective measurement values to the at least one control station in data packets at a defined time, wherein when the analysis detects an abnormal measurement signal variation, increasing a frequency of transmission of the respective sensor and each adjacent sensor, the respective sensor transmitting the measurement values to the at least one control station or to adjacent sensors to which the respective sensor is connected to through a common supply line and which measure an identical or physically similar quantity.

BRIEF DESCRIPTION OF THE DRAWINGS

The disclosure, advantageous embodiments and improvements of the disclosure and particular advantages of the disclosure will be explained and described in greater detail with reference to an exemplary embodiment shown in the attached drawing, in which.

DETAILED DESCRIPTION

Figure 1:
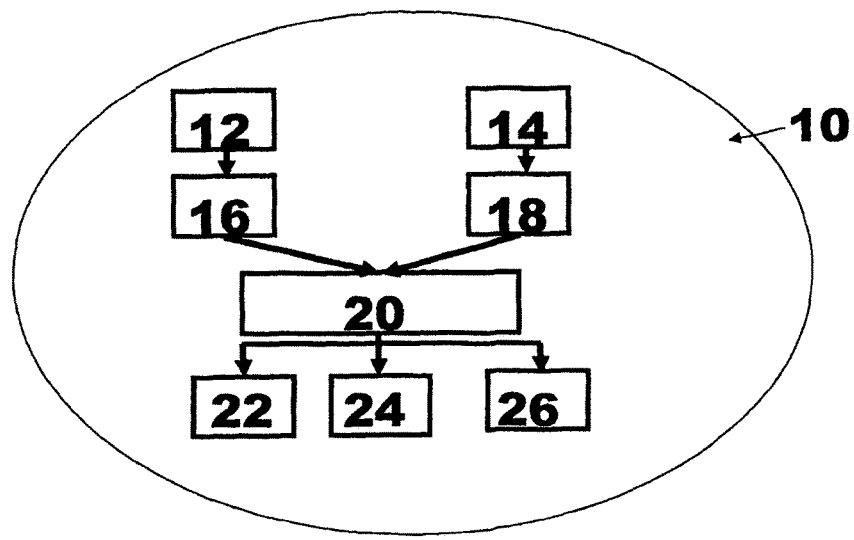
FIG. 1 shows a sensor in a diagrammatic representation with specification of the individual sequences in accordance with an exemplary embodiment of the present disclosure.

Exemplary embodiments of the present disclosure develop a novel data transmission strategy which provides for a simplified and not very cost-intensive data transmission and which avoids the disadvantages demonstrated.

According to the exemplary embodiments described herein the frequency of transmission of measurement signals is not provided statically as previously, but dynamically. In this context, the approach is to have the correct data available for analysis purposes at the correct time in the correct quantity and quality.

According to an exemplary embodiment of the present disclosure for this purpose the measuring devices are provided with an evaluating unit which enables each sensor to analyze the signal variations and trends measured. In this context, the evaluating algorithms used are not restricted only to monitoring various limits but also include complex statistical and model-based signal evaluation and classification methods.

In another exemplary embodiment disclosed herein, the signal variations are allocated to different classes on the basis of the result of the evaluation. To explain this, for example with reference to supply networks for flowing media, it is possible to classify the criterion of pressure as follows "pressure variation normal", "pressure outside the permitted range", "little pressure change", "large anomalous pressure change".

According to another embodiment of the disclosure, a frequency of transmission allocated to each signal variation in dependence on this classification. If the signal features are located, for example, in the class "pressure variation normal", the frequency of transmission can be reduced further in order to save energy. The values measured are then only temporarily stored in the sensor memory and dispatched in each case after a fixed time.

However, according to another exemplary embodiment of the present disclosure, a signal variation exhibit a large falling gradient, which results in it being allocated to the class of "large anomalous change", the respective sensor transmits the signals in shorter time intervals. The measurement values will then be transmitted, for example, no longer in intervals of 30 minutes as previously but, for example, every 10 minutes or even shorter, to the control room.

Transmitting data in correspondingly shortened periods also supplies a much more accurate image of the current situation in the supply network since only average values, for example over a period of 15 minutes, which are determined by the sensors, are transmitted to the control system. The shorter the time interval of signal transmission, the more accurate the picture of conditions.

This has the advantage that changes in the supply network concerned which have grave consequences for operation or safety can be determined more rapidly, since measurement values are transmitted more frequently to the control station in the case of a fault.

According to a further exemplary embodiment described herein the sensor transmits the determined classification information additionally to the transmitted signal to a decision support system located in the control station.

In yet another exemplary embodiment of the disclosure, this so-called decision support system can in the simplest case be a conventional alarm system with alarm limits and corresponding fault reporting and simple instructions for eliminating the problem, which alarm system only considers each signal individually by itself.

In this context, it is found to be advantageous that the decision support system analyzes the system status in its complete complexity and supports the operating personnel selectively by proposals for action in accordance with the individual and merged signal measurement values, the individual system states, the information items obtained therefrom, and the learned expert knowledge.

An exemplary embodiment of the present disclosure is provided that additionally also fault and diagnostic information items of the sensors and status information items of the sensors such as, for example, the battery status are transmitted to the control and decision support system and are processed further there.

Another exemplary embodiment of the present disclosure provides that the control and decision support system, in addition to evaluating measured signal information, for example identifying a defective sensor or its decreasing battery power, also generates work orders.

For this purpose, it is advantageous that the sensors, according to other exemplary embodiments of the disclosure, in each case have their specially allocated signal preprocessing and diagnostic unit which is capable of detecting and classifying erroneous signal states from the measured signals and monitoring the state of the sensor including the components connected thereto, such as batteries.

In this context, it is found to be particularly advantageous that inappropriate or unsuitable classifications, and thus erroneous classifications, are avoided by a suitable choice of the classification features and classification limits. Otherwise, this would lead to an undesirably frequent signal transmission which would significantly shorten the battery life of the sensor. Classification features are understood to be the signal characteristics extracted and/or processed from the measured signal.

Although it is not absolutely necessary for normal operation that the sensors described here can also receive data, it is of advantage if a bidirectional communication can take place between the control station and the sensors. This has the advantage that, for example, the sensor configuration can also be carried out by remote maintenance from the control station, that is to say the configuration of the frequency of transmission, the classification limits, the classification features and others.

A further advantage is found in the fact that as soon as an alarm generated by a sensor has been detected and acknowledged by the operating personnel, this is reported back to the sensor and the latter can thus reduce the frequency of transmission again in order to save energy.

To save the capacity of the battery, such as increasing its life, sensors can be provided, in which it is possible to choose between several transmitting and receiving options. Accordingly, both the transmitting and the receiving frequency and also the duration of reception can be adjusted.

For example, in normal operation, reception can be provided every x minutes for a duration of y minutes or, for example, reception takes place for z minutes after transmitting. In contrast, reception is provided for a duration of $y_F$ or, respectively, $z_F$ minutes in the case of a fault (n) detected in the signal and/or in the sensor.

Furthermore, a synchronization routine which allows configuration information to be reliably transmitted from the control system is suitably provided between sensor and control system.

FIG. 1 shows a sensor in a diagrammatic representation with specification of the individual sequences in accordance with an exemplary embodiment of the present disclosure. In FIG. 1, a sensor 10 according to the disclosure is reproduced in a diagrammatic representation as an oval, individual sequence points marked by numbers being specified in the oval. These sequence points correspond to a flow diagram with a decision box in which the decision about the further procedure is to be made by means of the measurement values or information items received here.

As shown in FIG. 1, at box 12 the sensor 10 measures a sensor signal 12, which is provided to an evaluating unit 20, and detects sensor diagnostic information items 14.

At box 18, the detected sensor diagnostic items are evaluated and classified.

At box 16, the sensor signal is classified, based on a corresponding classification diagnostic information items that are detected and evaluated for this purpose.

The sensor 10 includes an evaluating unit 20 that prepares and implements a decision of whether an automatic increase or reduction in the frequency of transmission of the signals to be transmitted is to be effected.

For example, at box 22, the evaluating unit 20 decides to reduce the frequency of transmission and temporarily stores the measurement values and diagnostic information items; at box 24, the evaluating unit 20 decides to maintain a constant frequency of transmission of the signal and diagnostic information items; and at box 26, the evaluating unit 20 decides to increase the frequency of transmissions of signal and diagnostic information items.

Figure 2:
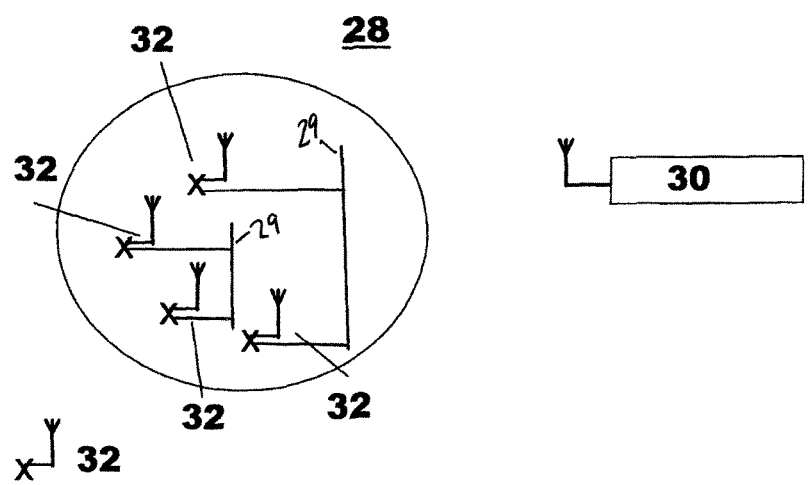
FIG. 2 shows a supply network including sensors and a control station in accordance with an exemplary embodiment of the present disclosure.

FIG. 2 shows a supply network including sensors and a control station in accordance with an exemplary embodiment of the present disclosure. As shown in FIG. 2, a supply network 28 includes sensors 10 or sensors with transmission unit 32, respectively, and includes a control station 30. The system illustrated in FIG. 2 is representative of the interaction between each individual sensor 10, 32 and the control station 30.

When disturbances occur in the supply network 28 such as, for example, leakages, pipe fractures or very high removals in water supply networks, which can propagate, in some cases with a time delay, via the supply lines 29 such as, for example, along the contiguous water supply lines. These disturbances can be first detected by a sensor and then also diagnosed by other sensors with a time delay. Signal- or model-based methods enable conclusions to be drawn with respect to the current disturbance resulting from the measured signals or simulated signals, respectively, and allow the source of the disturbance to be located.

If a sensor diagnoses a disturbance or an abnormality, it can be appropriate, depending on classification, to increase not only the frequency of transmission of the one sensor but also that of the adjacent sensors, even if these have not yet themselves diagnosed a disturbance due to the time delay in the propagation of the disturbance. This provides for a more reliable detection, faster fault location, and intervention as is available in known systems.

Adjacent sensors are those sensors which, although they can be located far apart from one another are, for example, connected to one another by a common water line through which a medium is flowing and measure an identical or physically similar quantity. The basis for an intelligent sensor network is the modeling of the relationships between the sensor positions and the network which can be stored either in the control system or in the sensor evaluating unit.

For example, it is possible that sensors become synchronized with one another, be it directly or via the control system, in which context they always transmit when the adjacent sensors are not transmitting, in order to avoid long pauses. This means that the measurement signals of two adjacent sensors, for example, do not always arrive in the control system at the full hour and half hour but, in normal operation, sensor one, for example, can always transmit at the full and half hour while an adjacent sensor two, in normal operation, can always transmit at an offset of a quarter hour, such as the quarter and three-quarter hour. Thus, for example, in normal operation, not every sensor provided in the network will receive at least one measurement value at each full hour, but instead the relevant signals of the various sensors always arrive with a time offset. This means that the control station more frequently receives current measurement signals, but these represent only some of the sensors in the network. However, experienced operating personnel can detect at least partially from these current measurement values whether the entire network is operating within its reliable normal range.

The communication for activating adjacent sensors can take place either directly between the sensors or by means of the control system. Communication via the control system has the advantage that existing communication links can be utilized and additional information items are present regarding adjacent sensor positions, line network, supply areas and directions of fault propagation. The configuration of which adjacent sensors are active for how long with what frequency of transmission with which disturbances can be carried out more easily and adapted dynamically with a communication by means of the control system. In addition, the control system knows the windows of reception of the individual sensors for data transmission.

However, it is also possible that sensors exchange information with one another, for example, when they are within radio range of one another, the data then being forwarded via a possibly existing control system from a, for example, central sensor to a linked control system without direct utilization of the communication infrastructure. Depending on use with respect to the specified transmitting and receiving energy or the communication costs, this may be advantageous since local radio protocols are at least partially more energy efficient than a transmission to the control station and can also be more cost-effective during the transmission.

Although increasing the frequency of transmission reduces the battery life, it has the advantage that disturbances can be detected more rapidly and thus also eliminated more rapidly, which leads to a rise in the quality of supply.

It can be advantageous to find the appropriate balance which, in turn, is possible by a flexible configuration of the sensors. Depending on the degree of integration of the sensors into the control system, in other exemplary embodiments the sensors can be configured directly from the control system or the sensors can be remotely configured by additional software.

In this context, the present disclosure also comprises any combinations of exemplary embodiments and individual design features or developments unless these are mutually exclusive.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE DESIGNATIONS

10 Sensor
12 Measured sensor signal
14 Sensor diagnostic information
16 Classification sensor signal
18 Classification diagnostic information
20 Evaluating unit for deciding with respect to automatic increase or decrease in the frequency of transmission
22 Decrease in the frequency of transmission and temporary storage of the measurement values and diagnostic information items
24 Constant frequency of transmission (signal+diagnostic information items)
26 Increase in the frequency of transmission (signal+diagnostic information items)
28 Supply network
30 Control station
32 Sensor with transmission unit

What is claimed is:

1. A system for monitoring a current state of a spatially extensive supply network, comprising:
at least one control station that monitors and controls the spatially extensive supply network; and
a plurality of sensors for transmitting current measurement values relating to an operating behavior to the at least one control station over the spatially extensive supply network,
wherein each sensor is located at respective positions in the spatially extensive supply network for locally determining the current measurement values, and includes an evaluating unit that analyzes measured signal variations and trends, wherein in order to transmit respective measurement values to the at least one control station, each sensor includes a data transmission unit which dynamically sets a frequency of transmission for the data in packets based on a classification of the measured signal variations, where each classification is associated with a specified transmission frequency,
wherein when a respective sensor detects a measurement signal variation, the respective sensor increases and subsequently reduces the frequency of transmission of the respective sensor and of each adjacent sensor, wherein the respective sensor transmits the measurement values to the at least one control station and wherein adjacent sensors are sensors that are spaced at a distance from the respective sensor and are connected to the respective sensor by a common supply line and which measure a quantity that is identical to the current measurement values determined by the respective sensor, and
wherein the control station is further to configure the supply network to control at least one of the adjacent sensors to be active, how long the at least one adjacent sensor is active, a frequency of transmission for the at least one active adjacent sensor, and for which disturbances the at least one active adjacent sensor is to evaluate.

2. The system as claimed in claim 1, wherein the respective sensor allocates signal variations to different classes of signal states in dependence on a result of the evaluation.

3. The system as claimed in claim 1, wherein the respective sensor:
models relationships between the positions of each sensor and the supply network to establish an intelligent sensor network; and
wherein to increase the frequency of transmission of each adjacent sensor comprises to identify, by the respective sensor, each adjacent sensor from the modeled relationship.

4. The system as claimed in claim 1, wherein each sensor synchronizes with one another directly or via the at least one control station, wherein each sensor transmits when adjacent sensors are not transmitting.

5. The system as claimed in claim 2, wherein each sensor synchronizes with one another directly or via the at least one control station wherein each sensor transmits when adjacent sensors are not transmitting.

6. The system as claimed in claim 1, wherein each sensor includes memory that stores the measured values and from which the stored signals are dispatched or called up in compressed form after a defined time.

7. The system as claimed in claim 1, wherein at least a part of each sensor includes a signal transmitter and a signal receiver which allow bidirectional communication.

8. The system as claimed in claim 2, wherein the respective sensor reduces the frequency of transmission of a signal when the signals measured by the sensor diagnose a measurement signal variation that is normal within the context of regular operation.

9. The system as claimed in claim 2, wherein each sensor synchronizes with one another directly or via the at least one control station wherein each sensor transmits when adjacent sensors are not transmitting.

10. The system as claimed in claim 3, wherein at least one of the at least one control station and the evaluating unit of the respective sensor stores the modeled relationship.

11. The system as claimed in claim 2, wherein the at least one control station includes a decision support system that receives the determined classification information and the transmitted signal from each sensor.

12. The system as claimed in claim 11, wherein the decision support system is an alarm system that analyzes each signal individually.

13. The system as claimed in claim 11, wherein the decision support system is configured to analyze a status of the supply network in its entirety and propose actions to operators in accordance with signal measurement values, individual system states, information items obtained from the system, and learned expert knowledge.

14. The system as claimed in claim 11, wherein the decision support system generates work orders.

15. The system as claimed in claim 13, wherein the decision support system receives and processes fault and diagnostic information items and status information items transmitted by each sensor.

16. The system as claimed in claim 14, wherein each sensor has a signal preprocessing and diagnostic unit that detects and classifies erroneous signal states from the measured signals and monitors a state of a respective sensor and a state of a component connected to the respective sensor.

17. The system as claimed in claim 16, wherein the component includes a battery.

18. The system as claimed in claim 17, wherein in order to conserve battery charge, each sensor is configured to set the frequency of transmission based additionally on a respective utilization of battery capacity and in dependence on a respective battery capacity.

19. A method for monitoring a current state of a spatially extensive supply network having at least one control station for monitoring and controlling the spatially extensive supply network and a plurality of sensors for transmitting measurement values relating to operating behavior to the at least one control station, the method comprising:
    measuring current measurement values at positions on the spatially extensive supply network corresponding to each sensor;
    analyzing measured signal variations and signal trends of the measured current values via an evaluating unit of each respective sensor; and
    transmitting respective measurement values in data packets from each respective sensor to the at least one control station at a frequency of transmission set based on a classification of the analyzed measured signal variations, the classification being associated with a specified transmission frequency,
    wherein when the analysis detects a measurement signal variation, increasing and subsequently reducing, by the respective sensor, the frequency of transmission of the respective sensor and of each adjacent sensor, the respective sensor transmitting the measurement values to the at least one control station and wherein adjacent sensors are sensors that are spaced at a distance from the respective sensor and are connected to the respective sensor through a common supply line and which measure a quantity that is identical to the current measurement values measured by the respective sensor, and
    wherein each sensor defines classification features and classification limits such that a frequent measurement signal transmission due to faulty classification is avoided and the battery life of a respective sensor is significantly increased.

20. The method as claimed in claim 19, wherein when an alarm generated by a respective sensor is recognized and acknowledged by the operator at the at least one control station, the at least one control station sends an acknowledgement to the respective sensor, and
    wherein the respective sensor reduces a frequency of transmitting a signal to save energy.

21. The method as claimed in claim 19, wherein the transmission of respective measured values is a wireless transmission.

22. A non-transitory computer readable medium having program code recorded thereon, which, when in communicable contact with a processor, causes the processor to execute a method for monitoring a current state of a spatially extensive supply network having at least one control station for monitoring and controlling the spatially extensive supply network and a plurality of sensors for transmitting measurement values relating to operating behavior to the at least one control station, each sensor having a respective processor, the method comprising:
    measuring current measurement values at positions on the spatially extensive supply network corresponding to each sensor;
    analyzing measured signal variations and signal trends of the measured current values via an evaluating unit of each respective sensor; and
    transmitting, respective measurement values in data packets from each respective sensor to the at least one control station at a frequency of transmission set based on a classification of the analyzed measured signal variations, wherein each classification is associated with a specified transmission frequency,
    wherein when the analysis detects a measurement signal variation, increasing and subsequently reducing, by the respective sensor, a frequency of transmission of the respective sensor and of each adjacent sensor, the respective sensor transmitting the measurement values to the at least one control station and wherein adjacent sensors are sensors that are spaced at a distance from the respective sensor and are connected to the respective sensor through a common supply line and which measure a quantity that is identical to the current measurement values measured by the respective sensor, and
    wherein each sensor defines classification features and classification limits such that a frequent measurement signal transmission due to faulty classification is avoided and the battery life of a respective sensor is significantly increased.

\* \* \* \* \*